United States Patent
Kim (10) Patent No.: US 8,943,586 B2
(45) Date of Patent: Jan. 27, 2015

(54) METHODS OF DETECTING DNS FLOODING ATTACK ACCORDING TO CHARACTERISTICS OF TYPE OF ATTACK TRAFFIC

(75) Inventor: Byoung Koo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 13/529,961

(22) Filed: Jun. 21, 2012

(65) Prior Publication Data

US 2013/0031626 A1    Jan. 31, 2013

(30) Foreign Application Priority Data

Jul. 29, 2011    (KR) .................. 10-2011-0076207

(51) Int. Cl.
G06F 21/00    (2013.01)
G06F 21/55    (2013.01)
G06F 21/57    (2013.01)
H04L 29/06    (2006.01)
H04L 29/12    (2006.01)

(52) U.S. Cl.
CPC ............ G06F 21/552 (2013.01); G06F 21/577 (2013.01); H04L 63/1458 (2013.01); H04L 61/1511 (2013.01); H04L 63/0227 (2013.01); H04L 2463/141 (2013.01)
USPC .................................. 726/22; 726/2; 726/23

(58) Field of Classification Search
CPC ... H04L 63/14; G06F 17/30864; G06F 21/00; G06F 21/566; G06F 17/30389
USPC .................................................. 726/2, 22–23
See application file for complete search history.

(56) References Cited

U.S. PATENT DOCUMENTS

2010/0122344 A1    5/2010  Wei et al.
2010/0269174 A1*   10/2010  Shelest ........................... 726/22

FOREIGN PATENT DOCUMENTS

| CN | 101567815 B | * | 5/2011 |
| KR | 1020060068468 A | | 6/2006 |
| KR | 1020100071747 A | | 6/2010 |
| KR | 1020110040005 A | | 4/2011 |

* cited by examiner

Primary Examiner — Michael Chao
Assistant Examiner — Shiuh-Huei Ku (57) ABSTRACT

Disclosed are methods of detecting a domain name server (DNS) flooding attack according to characteristics of a type of attack traffic. A method of detecting an attack by checking a DNS packet transmitted over a network in a computer device connected to the network, includes determining whether the number of DNS packets previously generated within a threshold time with the same type of message, the same specific address and the same field value as in the transmitted packet is greater than or equal to a given number, and determining the transmitted DNS packet as a packet related to the attack if the number of DNS packets previously generated within the threshold time is greater than or equal to the given number.

4 Claims, 6 Drawing Sheets

METHODS OF DETECTING DNS FLOODING ATTACK ACCORDING TO CHARACTERISTICS OF TYPE OF ATTACK TRAFFIC

CLAIM FOR PRIORITY

This application claims priority to Korean Patent Application No. 2011-0076207 filed on Jul. 29, 2011 in the Korean Intellectual Property Office (KIPO), the entire contents of which are hereby incorporated by reference.

BACKGROUND

1. Technical Field

Example embodiments of the present invention relate to methods of detecting a distributed denial of service (DDoS) or denial of service (DoS) attack, which drops a normal service connection, so that network and server resources are protected from the DDoS or DoS attack to provide smooth service, and more particularly, to methods of detecting only a type of attack traffic of a malicious user.

2. Related Art

As a representative open protocol of transmission control protocol/Internet protocol (TCP/IP) for service, a domain name system (DNS) is open to anyone. Due to this openness, an initial DNS service does not have any security concept. However, with increased commercial use of the Internet, the DNS has been exploited for query forgery and has been a target vulnerable to malicious DDoS or DoS attacks.

DNS failures caused by attacks occurred on Jan. 25, 2003 all over the world. Representative examples of attacks using security vulnerability of the DNS are a DNS cache poisoning attack, a DNS amplification attack, a malicious attack using a recursion query, an unauthorized zone transfer information disclosure, an unauthorized Berkeley Internet Name Domain (BIND) version information disclosure, and the like.

Figure 1:
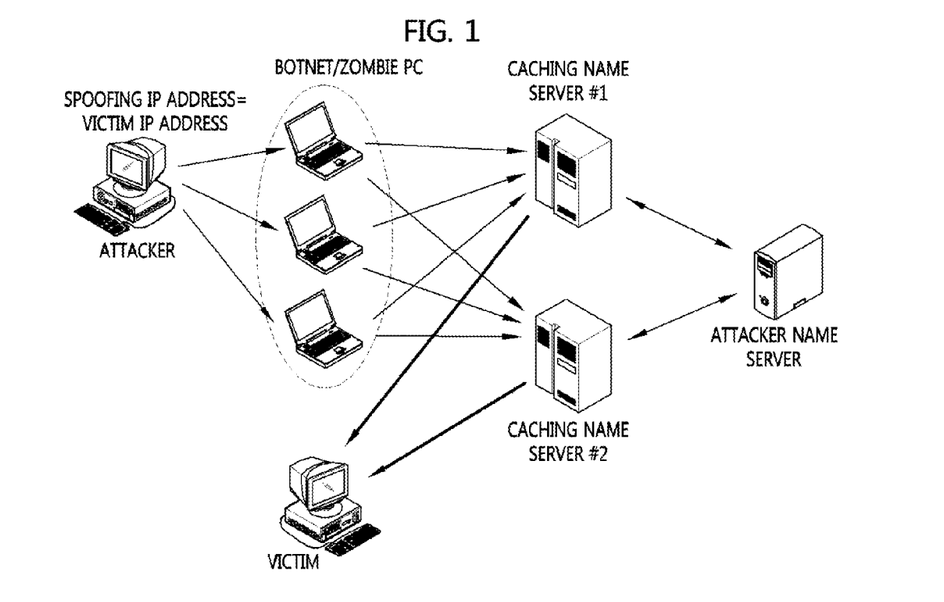
FIG. 1 is a conceptual diagram illustrating an example of a DNS attack.

A representative DDoS or DoS attack is the DNS amplification attack, illustrated in FIG. 1, in which a caching DNS server is misused as a tool for DDoS or DoS attacks against other systems.

DDoS or DoS attacks that pose a significant threat to the availability of a network or server are globally developing while targeting nations or Internet-based systems as in an attack against a root DNS server. Due to attacks by several tens of thousands to several hundreds of thousands of zombie personal computers (PCs), the damage is increasing day by day. A recent attack at a level of several to several tens of gigabits per second (Gbps) has completely disabled a network infrastructure.

Although hacking or DDoS or DoS attacks were previously recognized as specialized technology, it is possible to easily obtain a netbot attacker mainly used as an attack tool in a command and control (C&C) server, which is a command delivery server of the DDoS or DoS attacks, on the Internet.

Because it is possible to easily obtain the attack tool as described above, malicious attack traffic may be easily generated. However, there is a problem in that it is difficult for existing attack detection and defense techniques to distinguish normal users and malicious users. Also, a fixed dropping operation based on traffic measurement may drop traffic of normal users.

SUMMARY

Accordingly, example embodiments of the present invention are provided to substantially obviate one or more problems due to limitations and disadvantages of the related art.

Example embodiments of the present invention provide attack detection methods of selectively dropping only attack traffic of malicious users while protecting traffic of normal users.

According to example embodiments of the present invention, there is provided a method of detecting an attack by checking a DNS packet transmitted over a network in a computer device connected to the network, including: determining whether the number of DNS packets previously generated within a threshold time with the same type of message, the same specific address and the same field value as in the transmitted packet is greater than or equal to a given number; and determining the transmitted DNS packet as a packet related to the attack if the number of DNS packets previously generated within the threshold time is greater than or equal to the given number.

Here, the specific address may include a source address and a destination address when the DNS packet includes a query message.

Here, the specific address may include a destination address when the DNS packet includes a response message.

Here, a specific field of the specific field value may include at least one of an identification (ID) field and a query content field.

Here, the method may further include: dropping the transmitted packet when the transmitted packet is determined to be related to the attack.

Here, information regarding the previously generated DNS packets may be managed and referred to through a separate database (DB), information regarding a previously generated packet and its generation time may be stored in the DB, and the information regarding the packet may include at least one of an ID, a source address, a destination address, and query content.

According to other example embodiments of the present invention, there is provided a method of detecting an attack by checking a DNS packet transmitted over a network in a computer device connected to the network, including: determining whether or not there is a previous packet including a query message corresponding to a response message of the DNS packet among previously transmitted DNS packets; and determining a DNS packet including the response message as a packet related to the attack if there is no previous packet including the query message corresponding to the response message.

Here, whether or not there is the previous packet may be determined by comparing an ID, a destination address, and a source address of the DNS packet including the response message to an ID, a source address, and a destination address of the previous packet including a query message.

Here, information regarding a packet including the query message may be managed and referred to through a separate DB, and an ID, a source address, and a destination address of the packet including the query message may be stored in the DB.

Here, the method may further include: dropping the packet including the response message when the packet including the response message is determined to be related to the attack.

According to other example embodiments of the present invention, there is provided a method of detecting an attack by checking a DNS packet including a response message in a computer device connected to the network, including: determining whether or not a size of the response message of the DNS packet exceeds a maximum permissible size; and determining that the DNS packet is related to the attack when the packet is delivered to a server or host that does not provide extension mechanisms for DNS version 0 (EDNS0) if the size of the response message exceeds the maximum permissible size.

Here, the maximum permissible size may be 512 bytes.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used to herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, attack detection methods according to characteristics of a type of attack traffic to detect and drop a DNS flooding attack through network traffic analysis according to example embodiments of the present invention are disclosed. In particular, the example embodiments of the present invention provide attack detection methods of enabling service to be smoothly provided to normal users by selectively dropping only malicious users from a network flooding attack using a DNS protocol.

The attack detection methods on a network according to the example embodiments of the present invention may be performed by a device located between a query sending client located on the network over which a network packet is transmitted and a server for providing service to the client. Alternatively, the server receiving a query message from the client may perform the attack detection method. The attack detection methods according to the example embodiments of the present invention may be executable in a computer device appropriately arranged to minimize network traffic.

Figure 2A:
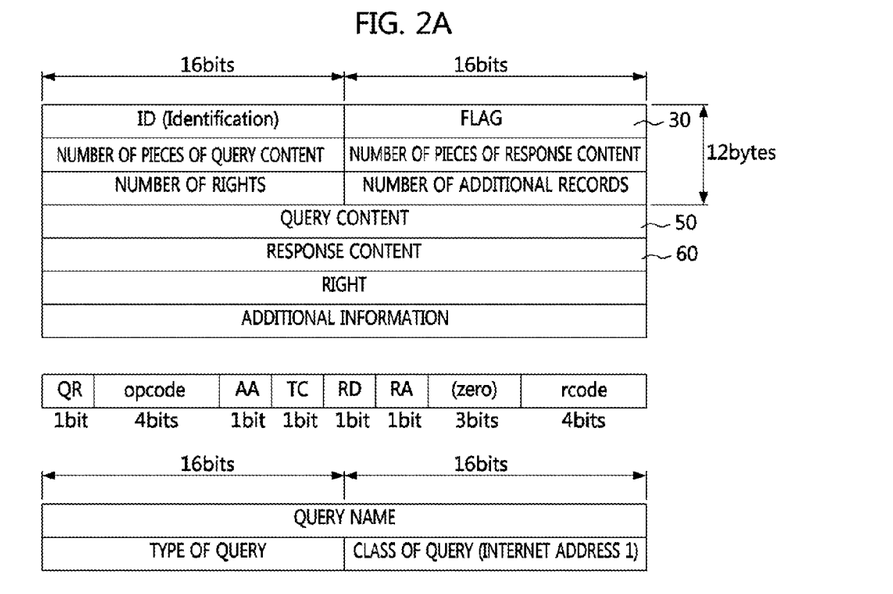
FIG. 2A is a conceptual diagram illustrating a DNS packet structure.
Figure 2B:
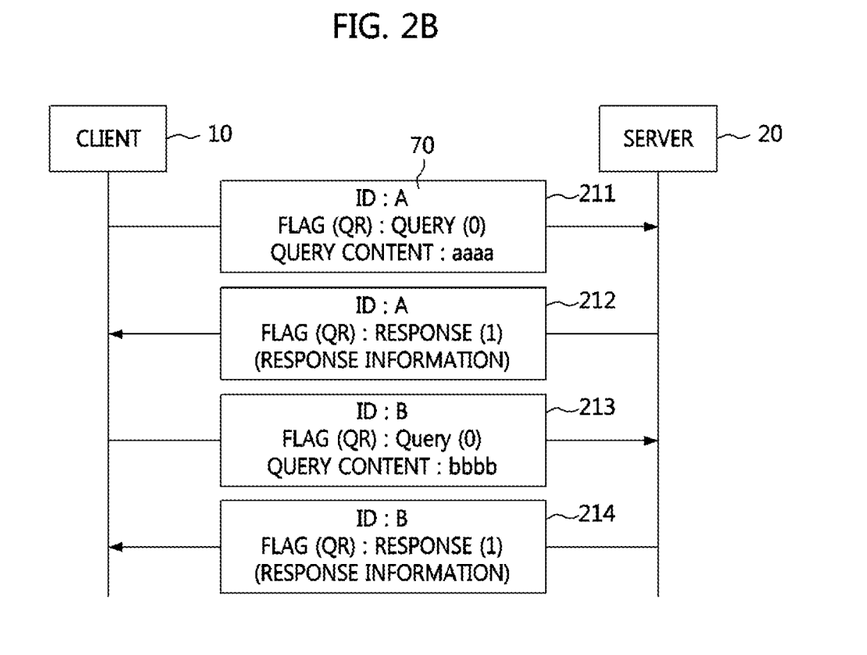
FIG. 2B is a conceptual diagram illustrating a DNS query request process.

FIG. 2A illustrates a DNS packet structure, and FIG. 2B is a conceptual diagram illustrating a DNS query request process.

The DNS is a system that maps a system name to an IP address, and performs an operation when a DNS query message and a response message corresponding thereto are transmitted and received. In addition, the query message and the response message are distinguished by a flag.

Referring to FIG. 2A, a message type for distinguishing the query message and the response message is stored in a QR flag field 30. That is, the QR flag field 30 stores 0 for the query message and 1 for the response message.

In addition, query content of the query message is stored in a query content field 50, and response content of the response message is stored in a response content field 60. Additional information is stored in other fields.

Referring to FIG. 2B, it can be seen that a query message 211 or 213 and a response message 212 or 214, which form a pair, are mutually exchanged between a client 10 and a server 20.

That is, for example, when the query message 211 having an ID A (70) is transmitted from the client 10 to the server 20, it can be seen that the response message 212 having the same ID A (70) is transmitted from the server to the client.

Example Embodiment of Attack Detection Method According to Attack Type 1

According to the example embodiment of the present invention, when a packet different from a normal structure is generated, this abnormal packet is determined to be related to an attack on the basis of a DNS packet transmission/reception structure described above. Hereinafter, the attack detection method according to the example embodiment of the present invention will be described with reference to the drawings.

Figure 3:
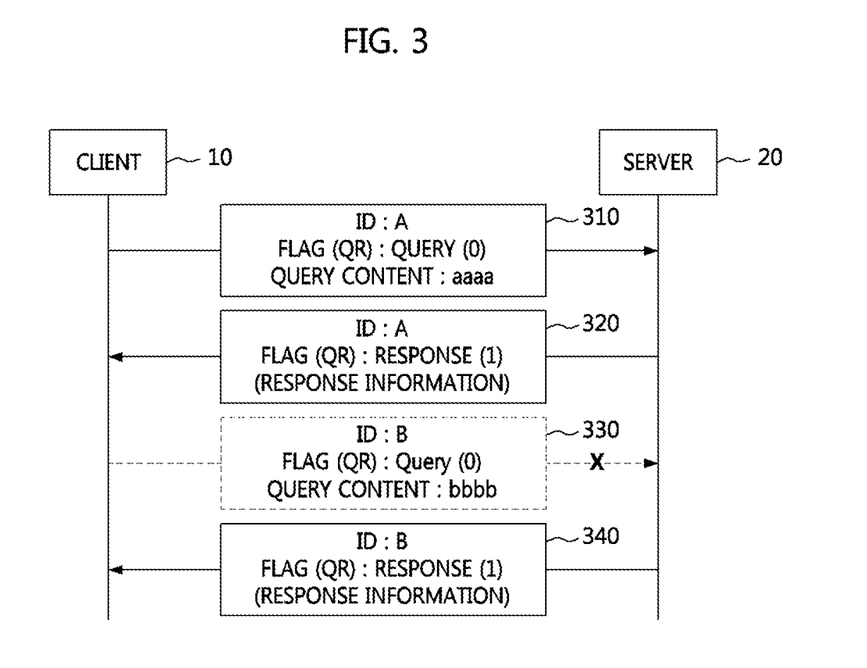
FIG. 3 is a conceptual diagram illustrating a type of attack according to an example embodiment of the present invention.

FIG. 3 is a conceptual diagram illustrating a type of attack according to an example embodiment of the present invention.

In a type of attack traffic illustrated in FIG. 3, it can be seen that a response message is received in a state in which there is no query message corresponding thereto.

It can be seen that, although a response message 320 corresponding to a query message 310 having an ID A is transmitted from the server 20 to the client 10, a response message 340 having an ID B is transmitted in a state in which there is no query message 330 corresponding thereto.

FIG. 3 illustrates the case in which no query message 330 is generated even though the query message 330 having the ID B should be first generated before the response message 340 having the ID B and transmitted from the client 10 to the server 20.

Accordingly, because the response message has been generated without a query message corresponding thereto, this may be determined to be related to an attack. That is, it is determined whether or not there is attack traffic by mapping an ID field value of a DNS packet to a QR value (0 or 1) of a flag field.

Subsequently, the attack detection method according to the attack type (hereinafter referred to as the attack type 1) described with reference to FIG. 3 will be described.

Figure 4:
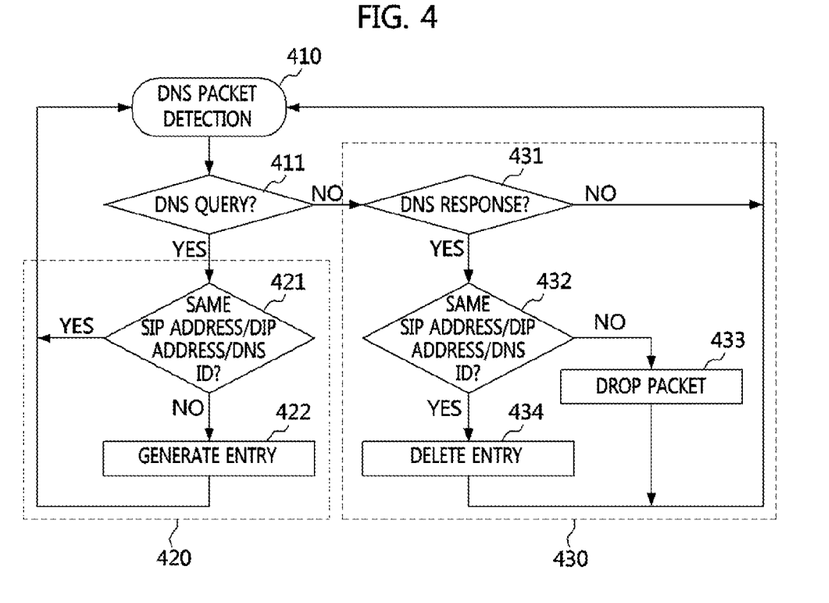
FIG. 4 is a sequence chart illustrating an attack detection process according to an example embodiment of the present invention.

As a sequence chart illustrating an attack detection process according to an example embodiment of the present invention, FIG. 4 illustrates a process of detecting an attack of the attack type 1 described with reference to FIG. 3.

Referring to FIG. 4, it can be seen that the process of detecting the attack of the attack type 1 includes a DNS packet detection step 410, a query message processing step 420, and a response message processing step 430.

In addition, referring to FIG. 4, the process of detecting the attack of the attack type 1 according to the example embodiment of the present invention is as follows.

In the DNS packet detection step 410, a DNS packet for determining whether or not there is an attack is detected from among packets transmitted over the network, and it is determined whether or not the DNS packet includes a query message or a response message by referring to a flag field 40 of the detected DNS packet (411).

In the query message processing step 420, it is checked whether or not there is a previous entry having the same source IP (SIP) address, destination IP (DIP) address, and DNS ID as in the DNS packet if the DNS packet includes the query message (421). If there is no previous entry, a new entry having information regarding the DNS packet is generated (422).

Here, the entry refers to a management table including a SIP address/DIP address/DNS ID, and may be utilized to find a previously generated query message corresponding to a response message of a current packet. In addition, if the response message for the generated query message has been lost, it is necessary to apply a time threshold value for management because unnecessary entries may be likely to occupy memory resources.

In the response message processing step 430, if the detected DNS packet is the response message (431), it is determined whether or not there is a previous DNS packet including a query message corresponding to the response message of the DNS packet (432).

At this time, because the detected DNS packet is the response message, mapping is performed by changing an IP address pair of the searched query message. That is, a SIP/DIP address pair of a current, incoming packet is mapped in reverse of the order of a SIP/DIP address pair of a query message generated in an entry. If there is no query message corresponding to the response message, the detected DNS packet is determined to be an attack packet and dropped (433).

On the other hand, if there is the query message corresponding to the response message, an entry corresponding to the query message is deleted (434).

As described above, it is determined whether or not there is attack traffic through session management for DNS query and response messages.

Example Embodiment of Attack Detection Method According to Attack Type 2

Figure 5:
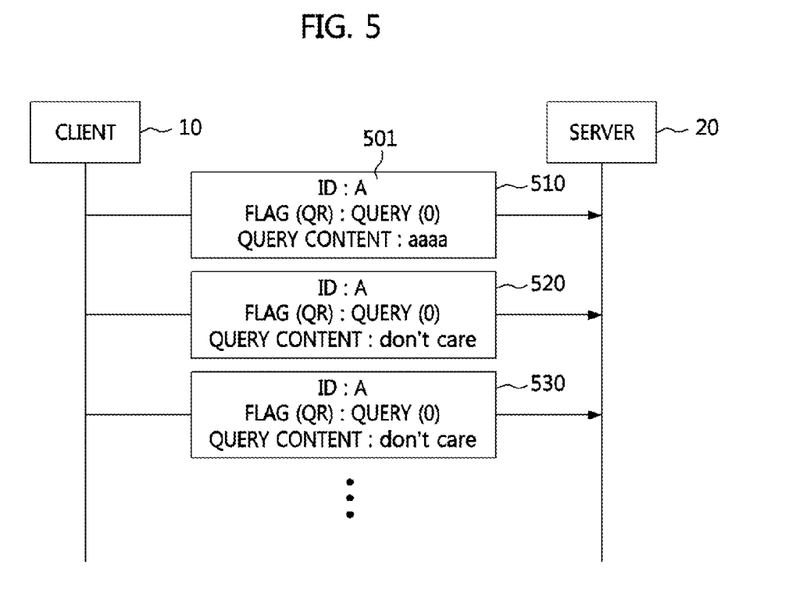
FIG. 5 is a conceptual diagram illustrating a type of attack according to another example embodiment of the present invention.

FIG. 5 is a conceptual diagram illustrating a type of attack according to another example embodiment of the present invention.

In a type of traffic illustrated in FIG. 5, it can be seen that query messages 510, 520, and 530 having the same ID A are continuously received from the same client 10.

If the query messages 510, 520, and 530 having the same ID A (501) are received from the same client 10 within a short period of time as described above, this may be determined to be an attack.

Basically, the occurrence of continuous queries is unnecessary in a cache mechanism on a DNS server or a DNS query application. In addition, the occurrence of queries having the same ID may be artificial. A cache time of a general application is basically 1 sec, and the cache time on the DNS server may be controlled in units of seconds according to information within a DNS message. That is, if the traffic type as described above is shown within a short period of time, for example, 1 sec, this may be determined to be an attack (attack type 2).

Even when there is a possibility of a false positive error in which a normal packet is determined to be related to an attack, this problem may be solved by setting the number of continuously generated queries to be determined to be an attack according to a situation. Like the attack type 1, in the attack type 2, it is possible to determine whether or not there is attack traffic by tracing an ID field value and a QR value of a flag field of the DNS packet.

Figure 6:
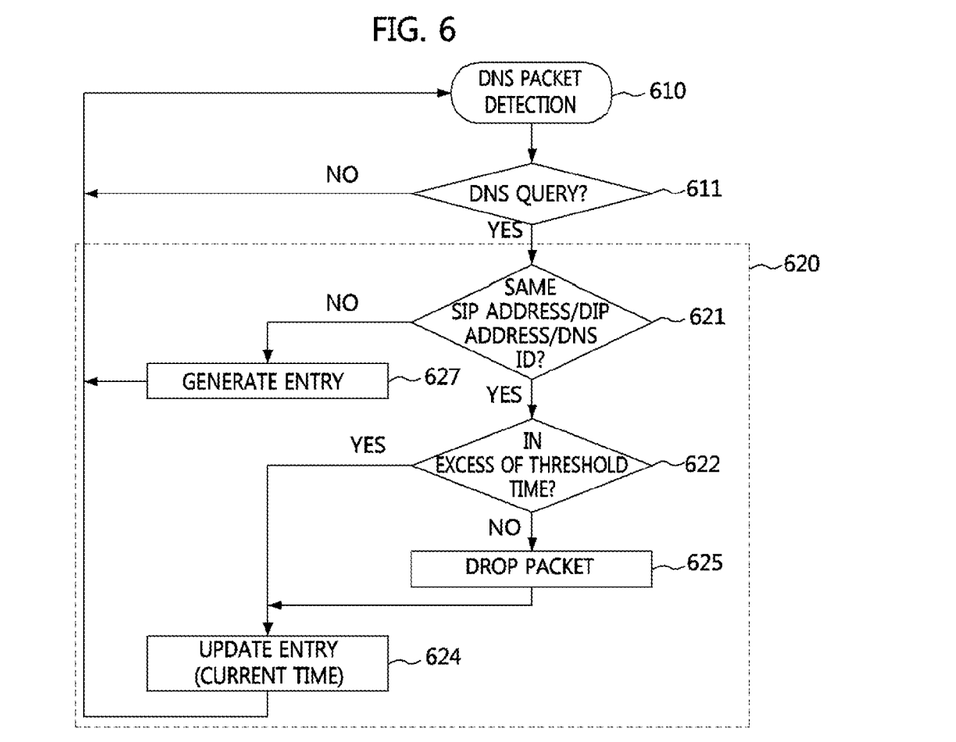
FIG. 6 is a sequence chart illustrating an attack detection process according to another example embodiment of the present invention.

As a sequence chart illustrating an attack detection process according to another example embodiment of the present invention, FIG. 6 illustrates a process of detecting an attack of the attack type 2 described with reference to FIG. 5.

Referring to FIG. 6, it can be seen that the process of detecting the attack of the attack type 2 includes a DNS packet detection step 610 and a continuous query message determination and processing step 620.

In addition, referring to FIG. 6, the process of detecting the attack of the attack type 2 according to the example embodiment of the present invention is as follows.

In the DNS packet detection step 610, a DNS packet for determining whether or not there is an attack is detected from among packets transmitted over the network, and it is determined whether or not the DNS packet includes a query message by referring to a flag field 40 of the detected DNS packet (611).

In the continuous query message determination and processing step 620, it is checked whether or not there is an entry having the same SIP address/DIP address/DNS ID if the DNS packet includes the query message (621). That is, it is checked whether or not the same query message was previously transmitted.

If there is the entry corresponding to the query message, it is checked whether or not the query message has been generated within a cache time (threshold time) described with reference to FIG. 5 (for example, within 1 sec immediately before the query message of a current packet is received) (622). If the query message having the same ID has been received within the threshold time, the packet is dropped and an entry generation time related to the query message is updated to a current time (625). If the message has not been generated within the threshold time, the entry generation time related to the query message is updated to the current time (624).

If there is no entry corresponding to the query message, an entry having information regarding the query message is generated (627).

In the entry management for detecting the attack of the attack type 2 as described above, it is possible to sufficiently detect an attack using a method of managing only several latest DNS IDs according to each SIP address so as to minimize a resource amount necessary for entry management. This is because the attack is more likely to be continuously made only with artificial DNS IDs in the case of the attack of the attack type 2.

Example Embodiment of Attack Detection Method According to Attack Type 3

Figure 7:
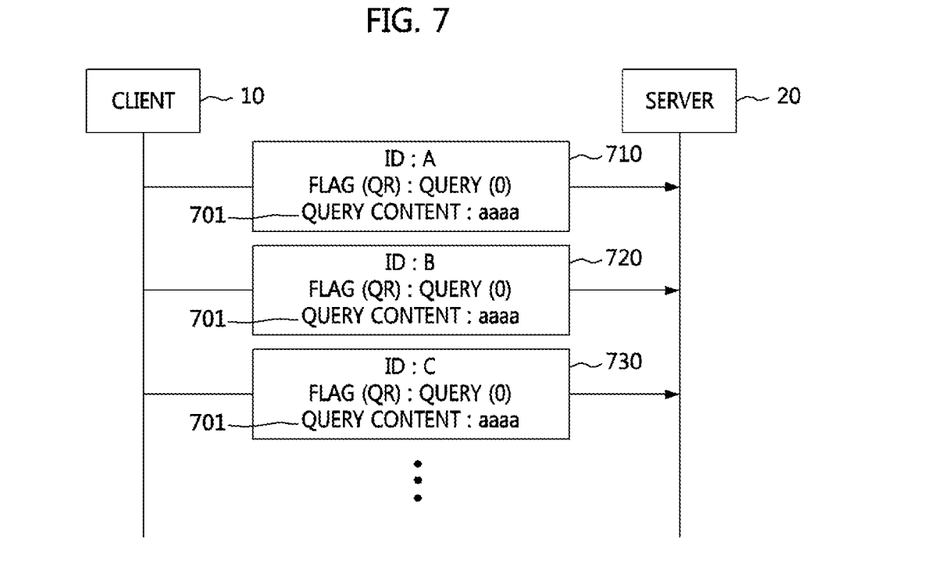
FIG. 7 is a conceptual diagram illustrating a type of attack according to still another example embodiment of the present invention.

FIG. 7 is a conceptual diagram illustrating a type of attack according to still another example embodiment of the present invention.

In a type of traffic illustrated in FIG. 7, query messages 710, 720, and 730 including the same query content 701 are continuously received from the same client 10.

If the query messages 710, 720, and 730 having the same query content 701 are continuously received from the same client 10 within a short period of time as described above, this may be determined to be an attack (attack type 3).

That is, if the traffic type as illustrated in FIG. 7 is shown within a short period of time, for example, 1 sec, as described with reference to FIG. 5, this may be determined to be an attack. Even when there is a possibility of a false positive error, this problem may be solved by setting the number of continuously generated queries to be determined to be an attack according to a situation. Likewise, in the attack type 3, it is possible to determine whether or not there is attack traffic by tracing an ID field value and a QR value of a flag field of the DNS packet.

Figure 8:
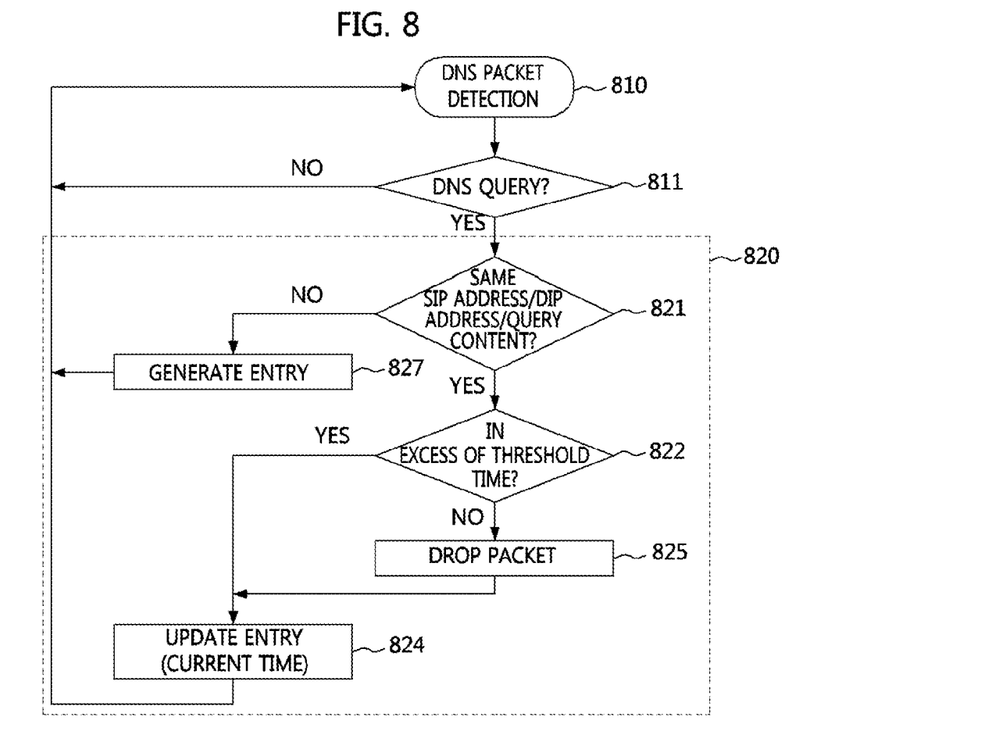
FIG. 8 is a sequence chart illustrating an attack detection process according to still another example embodiment of the present invention.

As a sequence chart illustrating an attack detection process according to another example embodiment of the present invention, FIG. 8 illustrates a process of detecting an attack of the attack type 3 described with reference to FIG. 7.

Referring to FIG. 8, it can be seen that the process of detecting the attack of the attack type 3 includes a DNS packet detection step 810 and a continuous query message determination and processing step 820.

In addition, referring to FIG. 8, the process of detecting the attack of the attack type 3 according to the example embodiment of the present invention is as follows.

In the DNS packet detection step 810, a DNS packet for determining whether or not there is an attack is detected from among packets transmitted over the network, and it is determined whether or not the DNS packet includes a query message by referring to a flag field 40 of the detected DNS packet (811).

In the continuous query message determination and processing step 820, it is checked whether or not there is an entry having the same SIP address/DIP address/query content if the DNS packet includes the query message (821). That is, it is checked whether or not the same query message was previously transmitted.

If there is an entry corresponding to the query message, it is checked whether or not the query message has been generated within a cache time (threshold time) described with reference to FIG. 7 (for example, within 1 sec immediately before the query message of a current packet is received) (822). If the query message having the same query content has been received within the threshold time, the packet is dropped and an entry generation time related to the query message is updated to a current time (825). If the message has not been generated within the threshold time, the entry generation time related to the query message is updated to the current time (824).

If there is no entry corresponding to the query message, an entry having information regarding the query message is generated (823).

In the entry management for detecting the attack of the attack type 3 as described above, it is possible to sufficiently detect an attack using a method of managing only several latest pieces of query content according to each SIP address so as to minimize a resource amount necessary for entry management. This is because the attack is more likely to be continuously made only with artificial query content in the case of the attack of the attack type 3. Here, because a query content field has a variable length, it is possible to increase an operating speed through matching of a hash value and a size.

Example Embodiment of Attack Detection Method According to Attack Type 4

Figure 9:
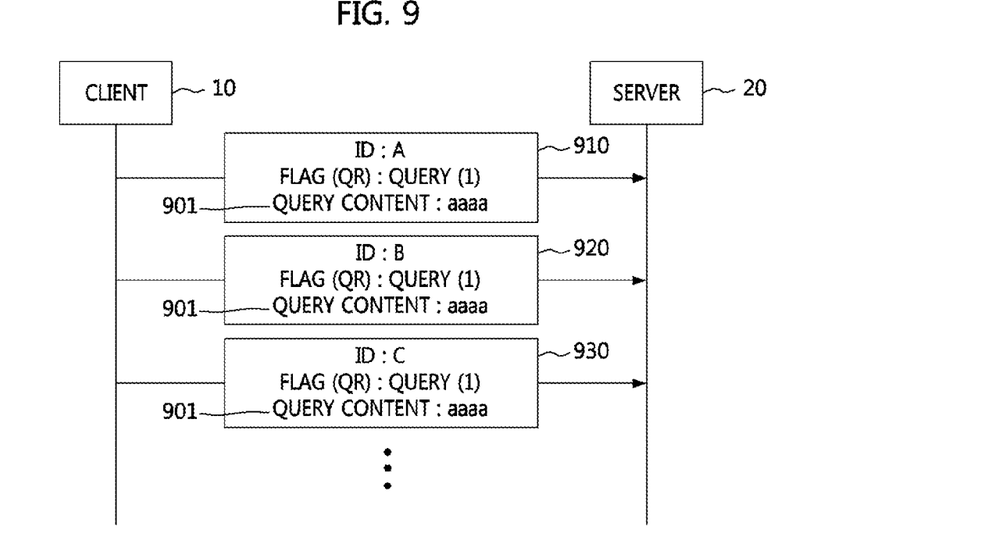
FIG. 9 is a conceptual diagram illustrating a type of attack according to still another example embodiment of the present invention.

FIG. 9 is a conceptual diagram illustrating a type of attack according to still another example embodiment of the present invention.

In a type of traffic illustrated in FIG. 9, response messages 910, 920, and 930 for the same query including the same query content 901 are continuously received from the same server 20.

If the response messages 910, 920, and 930 having the same query content 901 are received from the same server 20 within a short period of time as described above, this may be determined to be an attack (attack type 4).

That is, if the traffic type as illustrated in FIG. 9 is shown within a short period of time within a cache time (threshold time) of 1 sec, this may be determined to be an attack. In addition, even when there is a possibility of a false positive error, this problem may be solved by setting the number of continuously generated response messages to be determined to be an attack according to a situation. Likewise, in the attack type 4, it is possible to determine whether or not there is attack traffic by tracing an ID field value and a QR value of a flag field of the DNS packet.

For example, if a query message is sent by spoofing an IP address of a client with an intended target IP address when the client sends the query message, a server sends a response message for the query message to the target client IP address intended by the client. Accordingly, this is determined to be an attack in a position where the same response message is monitored and at a reception side.

In this method, it is possible to sense an attack regardless of where a message is sent. The method is effective against a DNS amplification attack through IP address spoofing. This method is possible because the response message is generated with query content field information of a query message. The attack is determined on the basis of the fact that known information is re-input.

Figure 10:
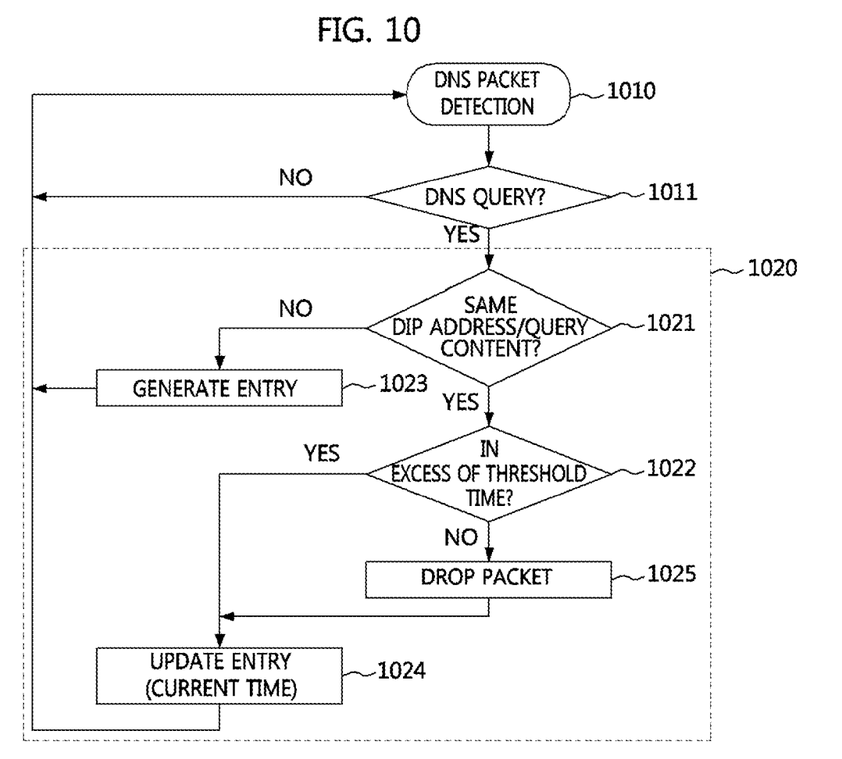
FIG. 10 is a sequence chart illustrating an attack detection process according to still another example embodiment of the present invention.

As a sequence chart illustrating an attack detection process according to another example embodiment of the present invention, FIG. 10 illustrates a process of detecting an attack of the attack type 4 described with reference to FIG. 9.

Referring to FIG. 10, it can be seen that the process of detecting the attack of the attack type 4 includes a DNS packet detection step 1010 and a continuous response message determination and processing step 1020.

In addition, referring to FIG. 10, the process of detecting the attack of the attack type 4 according to the example embodiment of the present invention is as follows.

In the DNS packet detection step 1010, a DNS packet for determining whether or not there is an attack is detected from among packets transmitted over the network, and it is determined whether or not the DNS packet includes a response message by referring to a flag field 40 of the detected DNS packet (1011).

In the continuous response message determination and processing step 1020, it is checked whether or not there is an entry having the same DIP address/query content if the DNS packet includes the response message (1021). That is, it is checked whether or not the same response message was previously transmitted.

If there is the entry corresponding to the response message, it is checked whether or not the response message has been generated within a cache time (threshold time) described with reference to FIG. 9 (for example, within 1 sec immediately before the query message of a current packet is received) (1022). If the response message having the same query content has been received within the threshold time, the packet is dropped and an entry generation time related to the response message is updated to a current time (1025). If the message has not been generated within the threshold time, the entry generation time related to the response message is updated to the current time (1024).

If there is no entry corresponding to the response message, an entry having information regarding the query message is generated (1023).

In the entry management for detecting the attack of the attack type 4 as described above, it is possible to sufficiently detect an attack using a method of managing only several latest pieces of query content according to each DIP address so as to minimize a resource amount necessary for entry management. Here, the query content is managed according to each DIP address, not each SIP address. It is possible to increase an operating speed through matching of a hash value and a size for query content as described with reference to FIG. 9 while minimizing resources necessary for entry management.

Additionally, the DNS amplification attack usually uses a packet flooding attack using a long-length packet based on the format of EDNS0. Of course, the process as illustrated in FIG. 10 can detect most attacks and an operation of detecting and dropping attacks on the basis of host information can be additionally performed.

Figure 11:
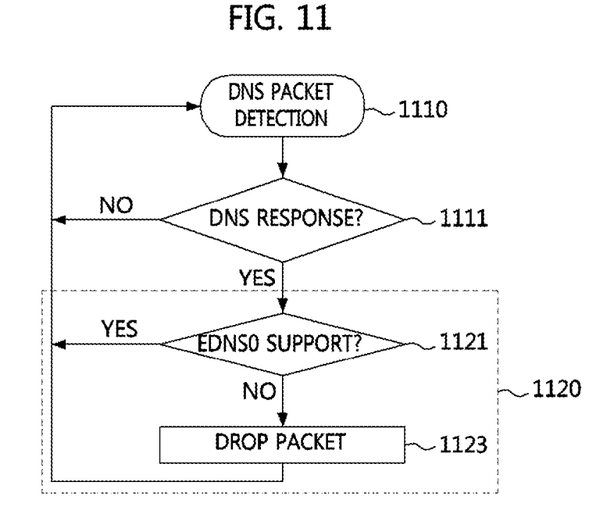
FIG. 11 is a sequence chart illustrating an attack detection process according to still another example embodiment of the present invention.

As a sequence chart illustrating an attack detection process according to still another example embodiment of the present invention, FIG. 11 illustrates a process of detecting a DNS amplification attack.

If a DNS packet is a response message, it is checked whether or not a size of the message is greater than or equal to 512 bytes (1111). If the size of the message is greater than or equal to 512 bytes and a host corresponding to a DIP address is not a server that provides EDNS0, the above-described DNS packet is dropped (1123).

The size of the DNS packet is generally limited to 512 bytes, but EDNS0 supports 512 bytes or more. That is, if a message is delivered to a server or host that does not provide EDNS0, the message may be determined to be arbitrarily generated by an attacker name server or the like. Accordingly, it is possible to adopt a basic attack detection and defense mechanism against most DNS amplification attacks exploiting the attacker name server.

In the above-described attack types 1 to 4, it is possible to detect and defend against an attack through a simple entry configuration and message matching. It is possible to implement mechanisms for the above-described attack types 1 to 4 with hardware according to a simple operation and resource configuration. That is, the mechanisms may also be implemented with software, but it is possible to obtain more advantageous effects when the mechanisms are implemented with hardware to defend against an attack in real time. When the above-described mechanisms are complementarily used, higher-precision attack detection and defense may be provided and the present invention may be easily applied to a host stage as well as a network stage.

The attack detection and defense mechanisms for the above-described attack traffic types perform operations effective to drop malicious traffic in real time, thereby defending against an attack without giving any load to a target server. In addition, it is possible to efficiently use limited hardware resources by minimizing the use of hardware resources.

In addition, there is an advantage in that the above-described attack defense technique may defend against an attack in units of packets regardless of a spoofing attack according to characteristics of a user datagram protocol (UDP).

In methods of detecting a DNS flooding attack according to characteristics of a type of attack traffic in accordance with the example embodiments of the present invention, it is possible to provide a smooth network service to normal users by classifying DNS flooding attacks into various types and detecting and dropping an attack according to type-specific characteristics. In addition, it is possible to efficiently utilize limited hardware resources without giving any load to an attack target server by providing a more effective technique on hardware.

While the example embodiments of the present invention and their advantages have been described in detail, it should be understood that various changes, substitutions and alterations may be made herein without departing from the scope of the invention.

What is claimed is:

1. A method of detecting an attack by checking a DNS packet transmitted over a network in a computer device connected to the network, comprising:
    when the DNS packet includes a first query message:
        determining whether a first previous entry corresponding to the DNS packet exists;

when the first previous entry does not exist, creating a new entry for the DNS packet, the new entry including an entry generation time; and when the first previous entry exists, dropping the DNS packet when a receive time of the DNS packet is within a threshold time of the entry generation time of the first previous entry and updating the entry generation time of the previous entry using a current time; and when the DNS packet includes a response message:

determining whether a second previous entry corresponding to a previous DNS packet including a second query message corresponding to the response message exists;

determining the DNS packet as a packet related to the attack when the second previous entry does not exist; and deleting the second previous entry when the second previous entry exists.

2. The method of claim 1, wherein whether the second previous entry exists is determined by comparing an ID, a destination address, and a source address of the DNS packet to an ID, a source address, and a destination address of the previous DNS packet including the second query message.

3. The method of claim 1, wherein:

information regarding the previous DNS packet including the second query message is managed and referred to through a separate DB, and an ID, a source address, and a destination address of the previous DNS packet including the second query message are stored in the DB.

4. The method of claim 1, further comprising:

dropping the DNS packet when the DNS packet is determined to be related to the attack.

* * * * *